United States Patent
Teeg et al.

[15] 3,650,680
[45] *Mar. 21, 1972

[54] PROCESSES FOR OBTAINING VANADIUM SUBOXIDES

[72] Inventors: Robert O. Teeg, Grosse Pointe Farms; Robert W. Hallman, St. Clair Shores, both of Mich.

[73] Assignee: Teeg Research, Inc., Detroit, Mich.

[*] Notice: The portion of the term of this patent subsequent to July 15, 1986, has been disclaimed.

[22] Filed: Apr. 12, 1965

[21] Appl. No.: 447,546

Related U.S. Application Data

[62] Division of Ser. No. 358,065, Apr. 7, 1964, Pat. No. 3,455,724.

[52] U.S. Cl. .................................23/21, 23/140, 23/19 V
[51] Int. Cl. .................................C22b 59/00, C01g 31/00
[58] Field of Search.......................23/19.1, 16, 21, 140, 204

[56] References Cited

UNITED STATES PATENTS 2,441,447  5/1948  Seabright..............................23/19.1
3,378,350  4/1968  Sasaki..................................23/140 X

OTHER PUBLICATIONS

Kosuge et al., " Journal of the Physical Soc. of Japan," Vol. 18, 1963, pp. 318– 319.

Mellor, " A Comprehensive Treatise on Inorganic & Theoretical Chemistry," Vol. 9, New Impression. Sept. 1949, pp. 743– 744.

Sasaki et al., " Journal of the Physical Society, Japan," Vol. 19, Sept. 1964, page 1748.

*Primary Examiner*—Herbert T. Carter
*Attorney*—Hauke, Gifford & Patalidis

[57] ABSTRACT

Methods for obtaining vanadium suboxide of the general formula $VO_x$, wherein $x$ is comprised between 1.5 and 2.02, consisting in heating vanadium pentoxide, contained in an inert boat, in a reduced atmosphere in the presence of a stoichiometric amount of vanadium pentoxide or, alternately, in continuously evacuating the atmosphere of the vessel in which the boat is placed, and recovering the vanadium suboxide in a bulk or crystalline form remaining in the boat.

4 Claims, No Drawings

PROCESSES FOR OBTAINING VANADIUM SUBOXIDES

The present application is a continuation-in-part of copending application Ser. No. 358,065, filed Apr. 7, 1964 and relating to Processes of Preparing Vanadium Suboxide Coatings, now U.S. Pat. No. 3,455,724, issued July 15, 1969.

The invention relates to vanadium suboxides and to processes for obtaining vanadium suboxides in bulk form as well as in single crystal form.

Vanadium suboxide, in the parent application as well as in the present application, designates materials of the general formula $VO_x$ wherein $x$ is a number comprised generally between 1.50 and 2.02. Thin films made of vanadium suboxide have found applications in thermistors, temperature detectors, infrared detectors and imaging devices, and the like. Although it is generally desirable to obtain vanadium suboxide in the form of thin films for such applications, it is also desirable for some applications to obtain vanadium suboxide in a bulk form, such as powder or pellets, or in a crystalline form such as single crystals.

In application Ser. No. 358,065 are disclosed processes for the preparation of vanadium suboxide thin films which comprise evaporating vanadium pentoxide ($V_2O_5$) at a temperature in the range of 500° to 850° C. under a reduced pressure, generally of the order of $10^{-4}$ mm. Hg to $10^{-6}$ mm. Hg, condensating thin films of such vanadium pentoxide upon a substrate and subsequently heating the substrate at a temperature in the range of 400° to 600° C. under a reduced pressure in the range of $10^{-1}$ mm. Hg to $10^{-4}$ mm. Hg in the presence of a reaction medium which may consist of an appropriate stoichiometric amount of vanadium sesquioxide ($V_2O_3$), or in the presence of a reaction medium consisting of a metal and/or metal oxide having greater affinity for oxygen than vanadium pentoxide, or more simply yet in reducing the vanadium pentoxide by simply heating under reduced pressure or in a controlled atmosphere containing oxygen at a pressure at most equal to the equilibrium vapor pressure of oxygen above the desired vanadium suboxide at the reaction temperature.

It has also been found that it is possible to obtain not only vanadium suboxide thin films according to the processes disclosed in the copending parent application, but also vanadium suboxide in a bulk form, such as powder or pellets, may be obtained according to said processes.

In order to prepare bulk vanadium suboxide according to the invention, vanadium pentoxide powder, or a vanadium pentoxide pellet which may be as thick as 10 mm. or more and which has been prepared from vanadium pentoxide, with or without sintering, is placed in a bell jar or closed container. The bell jar is preferably a high silica glass ampoule provided with means for evacuating the atmosphere to a reduced pressure in the order of $10^{-1}$ to $10^{-4}$ mm. Hg. In order to control the oxygen pressure over the sample being prepared a "getter" consisting of a boat containing, for example, vanadium sesquioxide is disposed proximate to the boat containing the vanadium pentoxide powder or pellet. It will, however, be appreciated that other convenient means for controlling oxygen pressure may be used to achieve comparable results.

The atmosphere of the bell jar is evacuated to a pressure of $10^{-2}$ mm. Hg, for example. The boats containing the vanadium pentoxide and the "getter" are heated to a temperature in the range of 400° to 600° C., preferably between 450° and 550° C., and maintained at that temperature for sufficient time to completely reduce the vanadium pentoxide to a vanadium suboxide such as vanadium dioxide having a formula substantially such as $VO_2$.

If the "getter" consists of an appropriate stoichiometric amount of vanadium sesquioxide, no special precaution in timing of the operation is required as the final vapor pressure of both the vanadium pentoxide being reduced and of the "getter" are equal, since the vanadium pentoxide is reduced to vanadium suboxide and the vanadium sesquioxide is oxidized to vanadium suboxide. According to the amount and particle size of the vanadium pentoxide powder, or according to the thickness of the pellet of vanadium pentoxide, the complete reduction of the vanadium pentoxide to vanadium suboxide takes from a few minutes to several hours under the conditions as above indicated. If an excess of "getter" is used, the time required for reduction of the vanadium pentoxide is decreased, but the timing of the operation becomes critical.

The use of a "getter" may also be dispensed with by simply heating the vanadium pentoxide in the bell jar under reduced oxygen pressure, between $10^{-1}$ to $10^{-4}$ mm. Hg, and by simultaneously and continuously evacuating the atmosphere of the bell jar so as to reduce the oxygen vapor pressure until the vanadium pentoxide has been completely reduced to the desired vanadium suboxide.

In order to prepare vanadium suboxide in single crystal form, vanadium pentoxide is placed in a boat, preferably made of platinum or made of tantalum lined with platinum. The boat is placed in a bell jar and the jar atmosphere is evacuated to a pressure of $10^{-4}$ to $10^{-6}$ mm. Hg. The boat containing vanadium pentoxide is heated to a temperature of 500° to 850° C., at such pressure and preferably to a temperature of 650° to 700° C. at a pressure of substantially $10^{-5}$ mm. Hg. Vanadium pentoxide is continuously evaporated from the boat and is either evacuated continuously from the bell jar or condensated on a cooler substrate disposed in the bell jar until all the vanadium pentoxide has been entirely evaporated from the boat and only a blue-black needlelike crystalline residue remains adhering to the walls of the boat.

The process can be greatly accelerated if the evaporation of vanadium pentoxide from the boat is effected in the presence of a preferably stoichiometric amount of vanadium sesquioxide, or in the presence of a metal and/or metal oxide having greater affinity for oxygen than vanadium pentoxide.

The blue-black crystalline residue thus obtained consists of individual prismatic needles approximately 8 mm. long, 0.5 mm. wide and 0.2 mm. thin. X-ray examination of the residue, using the Laue back reflection technique, reveals diffraction zones consistent with a single crystal structure. Resistivity measurements effected on the crystals as a function of temperature reveal an abrupt decrease of resistivity at about 65° C. of three to five orders of magnitude for an increase in temperature of 0.5° C., which is typical of the behavior of vanadium suboxides of the general formula $VO_x$, wherein $x$ is a number approximately equal to 2, but the exact limits of which are not precisely known at the present although they seem to be comprised between about 1.88 and about 2.02.

Having thus described the invention, what is claimed as being new and desired to be secured by Letters Patent is:

1. Process for the preparation of vanadium suboxide of the formula $VO_x$ wherein $x$ is comprised between 1.5 and 2.02 which comprises evaporating vanadium pentoxide in an inert boat in a bell jar at a temperature in the range of 500° to 850° C. under a pressure in the range of $10^{-4}$ mm. Hg to $10^{-6}$ mm. Hg, and simultaneously evacuating the bell jar for eliminating the evaporated vanadium pentoxide until all vanadium pentoxide is evaporated leaving a crystalline residue of vanadium suboxide, and recovering said crystalline residue remaining in said boat.

2. Process for the preparation of vanadium suboxide of the formula $VO_x$ wherein $x$ is comprised between 1.5 and 2.02 which comprises evaporating vanadium pentoxide in an inert boat in a bell jar at a temperature in the range of 650° to 700° C. under a pressure of substantially $10^{-5}$ mm. Hg, simultaneously evacuating the bell jar for eliminating the evaporated vanadium pentoxide until all vanadium pentoxide is evaporated leaving a crystalline residue of vanadium suboxide, and recovering said crystalline residue remaining in said boat.

3. Process for the preparation of vanadium suboxide having the formula $VO_x$ wherein $x$ is comprised between 1.5 and 2.02 which comprises evaporating vanadium pentoxide in an inert boat in a bell jar at a temperature in the range of 400° to 600° C. under a pressure in the range of $10^{-1}$ mm. Hg to $10^{-4}$ mm. Hg, simultaneously evacuating the bell jar for eliminating the evaporated vanadium pentoxide until all vanadium pentoxide is evaporated leaving a residue of vanadium suboxide in said boat, and recovering said vanadium suboxide remaining in said boat in a bulk form.

4. Process for the preparation of vanadium suboxide having the formula $VO_x$ wherein $x$ is comprised between 1.5 and 2.02 which comprises evaporating vanadium pentoxide in an inert boat in a bell jar at a temperature in the range of 450° to 550° C. under a pressure of substantially $10^{-2}$ mm. Hg, simultaneously evacuating the bell jar for eliminating the evaporated vanadium pentoxide until all vanadium pentoxide is evaporated leaving a residue of vanadium suboxide in said boat, and recovering said vanadium suboxide remaining in said boat in a bulk form.

* * * * *